United States Patent
Iyer et al.

(10) Patent No.: US 10,769,092 B2
(45) Date of Patent: Sep. 8, 2020

(54) APPARATUS AND METHOD FOR REDUCING LATENCY OF INPUT/OUTPUT TRANSACTIONS IN AN INFORMATION HANDLING SYSTEM USING NO-RESPONSE COMMANDS

(71) Applicant: DELL PRODUCTS, LP, Round Rock, TX (US)

(72) Inventors: Shyamkumar T. Iyer, Austin, TX (US); Srikrishna Ramaswamy, Austin, TX (US); Austin P. Bolen, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/227,710

(22) Filed: Dec. 20, 2018

(65) Prior Publication Data

US 2020/0201806 A1 Jun. 25, 2020

(51) Int. Cl.
*G06F 3/06* (2006.01)
*G06F 11/07* (2006.01)
*G06F 13/42* (2006.01)

(52) U.S. Cl.
CPC .. *G06F 13/4221* (2013.01); *G06F 2213/0026* (2013.01)

(58) Field of Classification Search
None
See application file for complete search history.

(56) References Cited

U.S. PATENT DOCUMENTS

| 10,235,195 B2 | 3/2019 | Iyer et al. | |
|---|---|---|---|
| 10,261,698 B2 | 4/2019 | Ramaswamy et al. | |
| 10,261,699 B2 | 4/2019 | Ramaswamy et al. | |
| 2003/0014544 A1* | 1/2003 | Pettey | H04L 29/06 709/249 |
| 2003/0131055 A1* | 7/2003 | Yashchin | G06Q 10/107 709/204 |
| 2006/0123114 A1* | 6/2006 | Aoki | H04L 12/1467 709/226 |
| 2007/0214369 A1* | 9/2007 | Roberts | G06F 21/79 713/192 |
| 2009/0319747 A1* | 12/2009 | Jibbe | G06F 3/0605 711/170 |
| 2010/0070732 A1* | 3/2010 | Strutt | G06F 3/0605 711/170 |
| 2011/0286466 A1* | 11/2011 | Ge | H04L 45/04 370/401 |
| 2013/0117744 A1* | 5/2013 | Klein | G06F 9/45533 718/1 |

(Continued)

*Primary Examiner* — Hyun Nam
(74) *Attorney, Agent, or Firm* — Larson Newman, LLP

(57) ABSTRACT

An information handling system reduces latency of input/output transactions. The information handling system includes a system memory and an accelerator. The accelerator intercepts a command response that is issued by the system memory, determines a correct drive from an incorrect drive based on an attribute of the command response, and maps an address of the command response and sends the command response to the correct drive. The no-response command is sent to the incorrect drive. The correct drive completes the command response, and the incorrect drive issues a response that is disregarded by the accelerator.

20 Claims, 3 Drawing Sheets

(56) References Cited

U.S. PATENT DOCUMENTS

| | | | |
|---|---|---|---|
| 2013/0332735 A1* | 12/2013 | Luo | H04L 9/3273 713/169 |
| 2014/0189212 A1* | 7/2014 | Slaight | G06F 12/0866 711/103 |
| 2014/0281283 A1* | 9/2014 | Shachann | G11C 7/1075 711/149 |
| 2015/0312584 A1* | 10/2015 | Boyce | H04N 19/513 375/240.16 |
| 2018/0189225 A1 | 7/2018 | Ramaswamy et al. | |

* cited by examiner

APPARATUS AND METHOD FOR REDUCING LATENCY OF INPUT/OUTPUT TRANSACTIONS IN AN INFORMATION HANDLING SYSTEM USING NO-RESPONSE COMMANDS

CROSS REFERENCE TO RELATED APPLICATIONS

Related subject matter is contained in co-pending U.S. patent application Ser. No. 16/228,566 entitled "System and Method for Accelerating Performance of Non-Volatile Memory RAID Stacks," filed Dec. 20, 2018, the disclosure of which is hereby incorporated by reference.

Related subject matter is contained in co-pending U.S. patent application Ser. No. 16/228,571 entitled "System and Method of Improving Efficiency in Parallel Data Processing of RAID Array," filed Dec. 20, 2018, the disclosure of which is hereby incorporated by reference.

FIELD OF THE DISCLOSURE

This disclosure generally relates to information handling systems, and more particularly relates to reducing latency of input/output transactions in an information handling system using no-response commands.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a system memory and an accelerator. The accelerator may intercept a command response that is issued by the system memory, determine a correct drive from an incorrect drive based on an attribute of the command response, and map an address of the command response and send the command response to the correct drive. The no-response command is sent to the incorrect drive. The correct drive completes the command response, and the incorrect drive issues a response that is disregarded by the accelerator.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
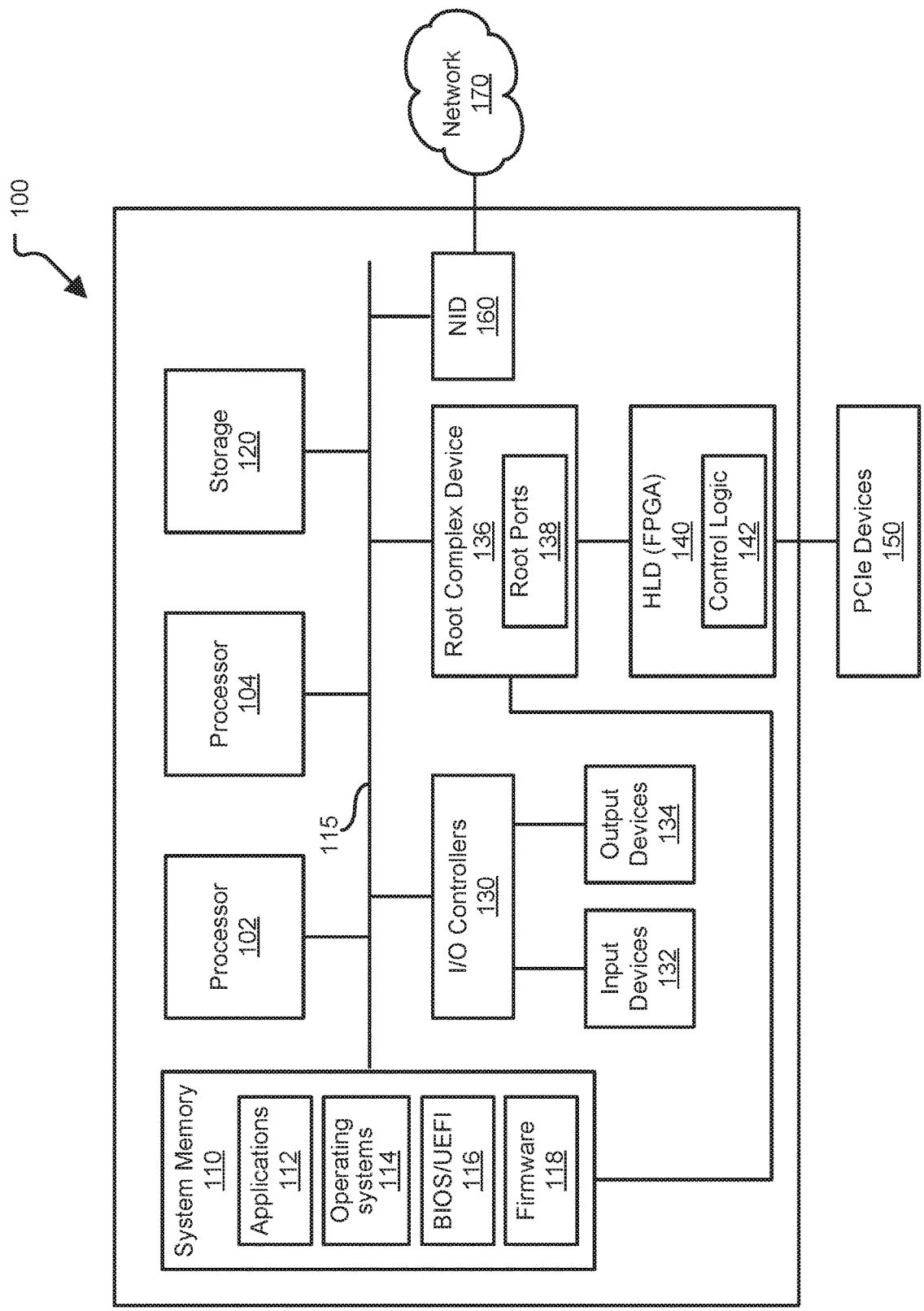
FIG. 1 is a block diagram of an information handling system according to an embodiment of the present disclosure.

FIG. 1 illustrates an information handling system (IHS) 100, within which one or more of the described features of the various embodiments of the disclosure can be implemented. For purposes of this disclosure, the information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Furthermore, the information handling system can include processing resources for executing machine-executable code, such as a central processing unit (CPU), a programmable logic array (PLA), an embedded device such as a System-on-a-Chip (SoC), or other control logic hardware. Information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. Information handling system can also include one or more buses operable to transmit information between the various hardware components.

The IHS 100 includes one or more processors, such as processors 102 and 104, coupled to system memory 110 via system interconnect or bus 115. Also coupled to system interconnect 115 is storage 120 within which can be stored one or more software and/or firmware modules and/or data. In one embodiment, the storage 120 can be a hard drive or a solid state drive. The one or more software and/or firmware modules within the storage 120 can be loaded into system memory 110 during operation of the IHS 100. As shown, system memory 110 can include multiple software and/or firmware modules including applications 112, operating system 114, basic input output system/unified extensible firmware interface (BIOS/UEFI) 116 and firmware 118. In one or more embodiments, BIOS/UEFI 116 includes the additional functionality associated with UEFI and can include UEFI images and drivers. The various software and/or firmware modules have varying functionality when their corresponding program code is executed by processors 102 and/or 104 or other processing devices within IHS 100.

IHS 100 further includes one or more I/O controllers 130 which support connection by, and processing of signals from, one or more connected input device(s) 132 such as a keyboard, mouse, touch screen, or microphone. I/O controllers 130 also support connection to and forwarding of output signals to one or more connected output devices 134, such as a monitor, display device or audio speaker(s).

IHS 100 further includes a root complex device 136 that is coupled to the system interconnect 115 and system memory 110. The IHS 100 further includes a hardware logic device (HLD) or inline accelerator such as a field programmable gate array (FPGA) 140. In other embodiments, the HLD may be an application specific integrated circuit (ASIC) or other type of integrated circuits (IC). Root complex device 136 has several root ports 138. Root complex device 136 is coupled to FPGA 140, and also connects the processor 102 and system memory 110 to a peripheral component interconnect express (PCIe) fabric. Root complex device 136 can support several PCIe root ports 138. The root ports are connected to an endpoint device via FPGA 140. Root complex device 136 generates transaction requests for processor 102, transmits packets through root ports 138, and receives packets from root ports 138. The received packets are then forwarded to system memory 110 or processor 102.

FPGA 140 supports connection to and processing of signals from one or more connected PCIe device(s) 150. FPGA 140 includes hardware control logic 142 that can perform one of more of the methods described herein. In one embodiment, PCIe device(s) 150 can include graphic processing units and storage devices such as solid state drives, including nonvolatile memory express (NVMe) devices. FPGA 140 is coupled to root complex device 136. FPGA 140 supports transmission of data to and from PCI devices 150.

IHS 100 further includes a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. Network 170 is indicated as a single collective component for simplicity. However, it should be appreciated that network 170 can include one or more direct connections to other devices as well as a more complex set of interconnections as can exist within a wide area network, such as the Internet.

Figure 2:
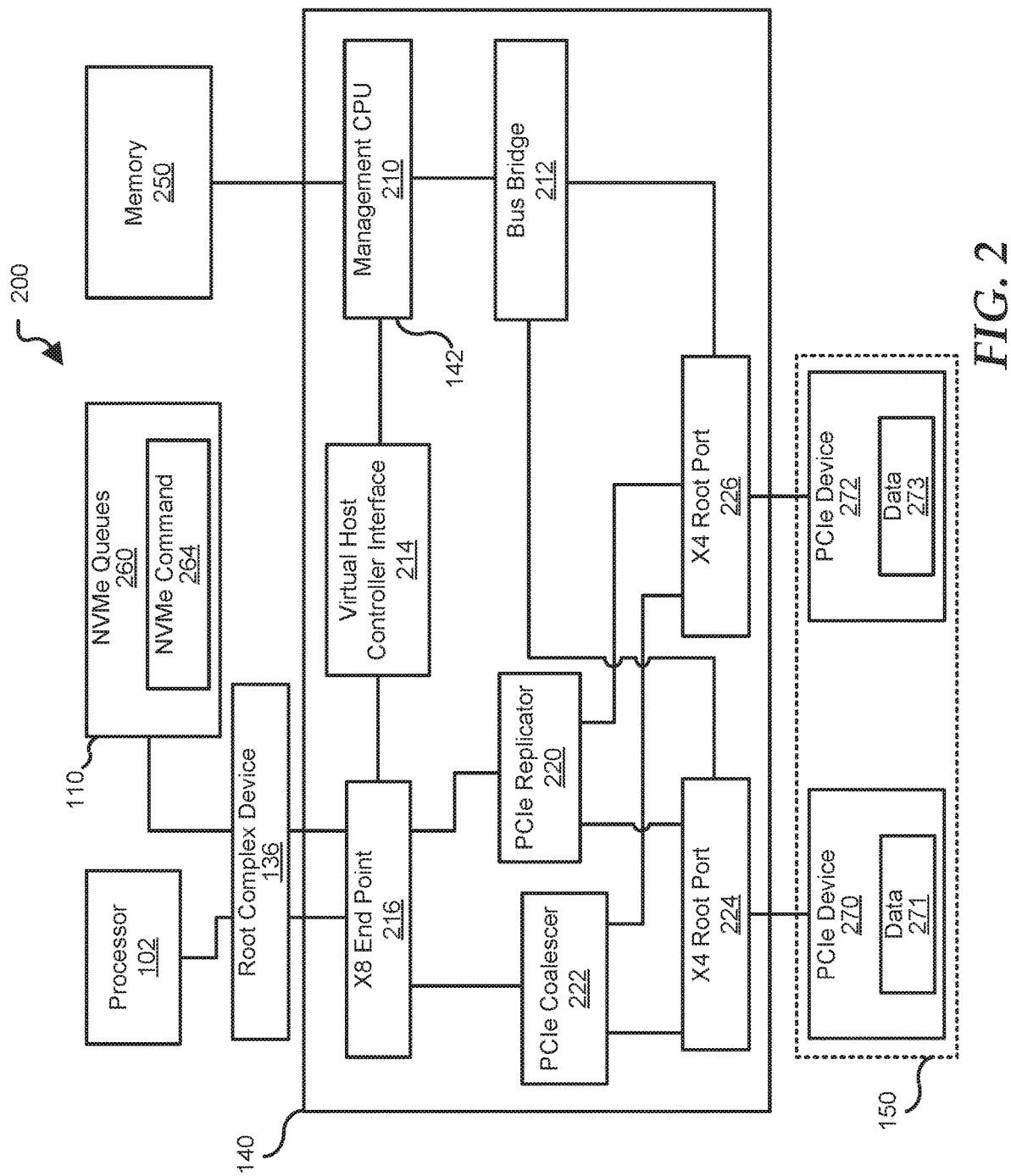
FIG. 2 is a block diagram of a field programmable gate array (FPGA) that facilitates latency reduction during an input/output (I/O) transaction between a processor and PCIe devices, according to an embodiment of the present disclosure.

FIG. 2 shows a block diagram of the FPGA 140 that facilitates a latency reduction in the IHS. In an embodiment, the processor writes a command that is directed to one or more drives, referred to hereinafter as the correct drive. For non-targeted drive or drives, hereinafter referred to as an incorrect drive, it is disadvantageous for the processor to perform additional processing of a response that comes from the incorrect drive. In this embodiment, the FPGA facilitates reduction of latency in the processor by making sure that the incorrect drive responds in a benign way such that the processor will not be doing the additional processing.

In an embodiment, the FPGA 140 is configured as an accelerator that utilizes the control logic 142 to control I/O operations of the FPGA. The control logic 142 includes a management CPU 210 that is communicatively coupled to a bus bridge 212 and to the FPGA random access memory (RAM) virtual host controller interface 214. FPGA RAM virtual host controller interface 214 is communicatively coupled to a host virtual end point 216. Management CPU 210 is further coupled to an external memory 250. Host virtual end point 216 is coupled to root complex device 136, which is coupled to processor 102 and system to memory 110. In one embodiment, system memory 110 can store NVMe queues 260 that may include an NVMe command 264 that is written by host software through the processor. Host virtual end point 216 is a pseudo endpoint for the processor 102. Host virtual end point 216 is further coupled to a PCIe transaction replicator 220 and to a PCIe transaction coalescer 222.

PCIe transaction replicator 220 is coupled to root ports 224 and 226. PCIe transaction coalescer 222 is also coupled to the root ports 224 and 226. Each of root ports 224 and 226 is further coupled to bus bridge 212. Root port 224 is also coupled to PCIe device 270, and root port 226 is also coupled to PCIe device 272. In another embodiment, the FPGA 140 utilizes a single root port rather than multiple root ports, such as the root ports 224 and 226. In this other embodiment, the single root port may include a switching topology that facilitates selection of the PCIe device that transacts with the processor or the system memory through the host virtual end point 216. For example, the single root port is a sixteen lane root port. In this example, the single root port may support multiple PCIe devices behind the single virtual end point 216.

During data transmission between processor 102 and PCIe devices 270 and 272, PCIe transaction coalescer 222 functions to achieve wire level coalescing of PCIe transactions upstream from processor 102. The PCIe transaction replicator 220 also facilitates wire level replication of PCIe transactions downstream to the PCIe devices 270 and 272. The PCIe device 270 includes data 271, and PCIe device 272 includes data 273. In one embodiment, data 271 and data 273 are substantially the same data. PCIe device 270 and PCIe device 272 can share substantially similar data. In another embodiment, PCIe device 270 and PCIe device 272 can contain data 271 and data 273 that are not duplicated. In one embodiment, PCIe devices 270 and 272 can be NVMe devices that are used in a redundant array of independent drives (RAID) configuration such that all of the data in PCIe device 270 is substantially duplicated in PCIe device 272. In other embodiments, the PCIe devices can be graphics processing units or remote direct memory access network interface cards that interact with the processor or system memory through the single PCIe end point.

In an embodiment, the FPGA 140 presents a number of drives to the processor 102. The presented number of drives includes the PCIe devices that are coupled to the FPGA. The presented PCIe devices are in physical communication with the processor and are expected to work on the one or more commands that are stored in the NVMe queues of the system memory 110. In this embodiment, the processor is configured to write the one or more commands that are directed to at least one of the PCIe devices. The PCIe device or devices that are targeted by the one or more commands are treated as the correct drive while the other non-targeted PCIe device or devices are treated as the incorrect drive.

For example, the PCIe devices 270 and 272 are coupled to the FPGA 140 through the root ports 224 and 226, respectively. In this example, the PCIe devices 270 and 272 are expected to work on the NVMe commands that were stored in the NVMe queues 260. The stored NVMe commands may include the NVMe command 264 that is written by the processor 102 at a next free submission queue slot in the NVMe queues 260. The submission queue slot is a circular buffer with a fixed slot size that the host software uses to submit the NVMe command or commands.

In an embodiment, the written NVMe command in the NVMe queues 260 may be directed to a particular PCIe device that was presented by the FPGA to the processor. For example, the NVMe command 264 may include a read command on the data 271 of the PCIe device 270. In this example, the PCIe device 270 is treated as the correct drive while the PCIe device 272 is treated as the incorrect drive. At this stage, even though the incorrect drive will not be processing the NVMe command 264, each of the presented PCIe devices is expecting to receive and execute the NVMe command 264.

With the NVMe command 264 stored in the NVMe queues 260, the processor 102 is configured to send a single doorbell to the presented drives that include the PCIe devices 270 and 272. The single doorbell may indicate the presence of a newly written NVMe command in the submission queue or NVMe queues. In an embodiment, the PCIe transaction replicator 220 intercepts the single doorbell from the processor 102. In this embodiment, the PCIe transaction replicator 220 is configured to replicate or duplicate the received single doorbell and distribute separate doorbells to each of the PCIe devices 270 and 272. The PCIe transaction replicator 220 duplicates the single doorbell based on a number of the PCIe devices that will receive the doorbell. For example, for two presented drives, the single doorbell is duplicated to generate a total of two doorbells. For five presented drives, the single doorbell is duplicated to generate another four doorbells, and so on. In the illustrated embodiment, the single doorbell is duplicated to generate a total of two doorbells. Each of the two doorbells is received by the corresponding PCIe devices 270 and 272. The doorbell indicates the presence of the NVMe command 264 in the NVMe queues 260.

In response to the received doorbells, each of the PCIe devices is configured to send a command fetch to the system memory 110. In an embodiment, the PCIe transaction coalescer 222 intercepts the response or command fetch from each PCIe device and combines the responses to form a single command fetch. The PCIe transaction coalescer 222 may then send the formed single command fetch to the system memory 110. For example, the PCIe devices 270 and 272 send a first command fetch and a second command fetch, respectively. In this example, the PCIe transaction coalescer 222 is configured to intercept and combine the first command fetch and the second command fetch to form the single command fetch. Afterwards, the PCIe transaction coalescer 222 is configured to send the single command fetch to the system memory 110 through the host virtual end point 216.

The system memory 110 receives the single command fetch from the FPGA 140 and issues a command response based on the received single command fetch. The command response may include the NVMe command that may be directed by the processor to the PCIe device 270 or PCIe device 272 for processing. For example, the NVMe command 264 includes the read command having an attribute that indicates logical block addresses of the data 271 that are found in the PCIe device 270. In this example, the NVMe command 264 is specifically addressed to the PCIe device 270 for processing. The PCIe device 270 in this case is the correct device while the PCIe device 272 is the incorrect device.

In an embodiment, the management CPU 210 is configured to intercept the issued command response from the system memory 110 and based upon the attributes associated to the intercepted command response, the management CPU 210 may analyze and determine the correct drive and the incorrect drive. In this embodiment, the management CPU manages address mappings for PCIe downstream end points. For example, the management CPU may modify the address of the command response in order to route the command response to the determined correct drive. For the incorrect drive that includes the PCIe device or devices that are not affected by the intercepted command response, it is disadvantageous for the processor to waste processing cycles or perform additional processing on the response coming from the incorrect drive. Accordingly, the management CPU 210 is configured to send a no-response command to the incorrect drive. The no-response command is an indication to the incorrect drive to respond in a benign way such that the processor will not be performing the additional processing. In an embodiment, the no-response command is a No-Op command that may be used to communicate with NVMe devices. In this embodiment, the No-Op command is issued to the incorrect drive, which recognizes the No-OP command and takes no further I/O related actions. The incorrect drive may also send out a completion and interrupt with encoded information in the reserved bits to indicate No-Op response. The management CPU monitors for the No-Op response based on the encoded information and discards the same. For the incorrect drive that does not support the No-Op command, the no-response command may include a new command that indicates to the incorrect drive not to take I/O related actions. The new command may further indicate that the processor may not receive or at least process the response that comes from the incorrect drive. The new command may take the form of a dummy command, or any instruction that is used as a basis by the management CPU 210 for disregarding the response from the incorrect drive.

For example, the system memory 110 issues the command response that includes the NVMe command 264 having an attribute that indicates logical block addresses of the data 271 that are found in the PCIe device 270. In this example, the management CPU 210 intercepts the NVMe command 264, analyzes and determines the correct drive which is the PCIe device 270, modifies the address or offset of the NVMe command 264 in order to route the NVMe command to the PCIe device 270, and sends the NVMe command 264 to the PCIe device 270.

For the PCIe device 272, which is the incorrect drive, the management CPU 210 may send the no-response command. For example, the no-response command includes the No-Op command that indicates an empty function or an instruction that directs the PCIe device 272 not to perform any processing on the command response and to move to next sequential instruction. In another example, the no-response command may include a dummy command such as sending a read command on a particular logical block address that is used by the management CPU 210 as an indication for disregarding the response that is coming from the incorrect drive.

In the preceding example, the management CPU 210 is aware that it will disregard any completion status or interrupt that is coming from the incorrect drive, PCIe device 272, in response to the sent no-response command. The management CPU 210, however, is configured to allow the completion status or interrupt coming from the correct PCIe device 270 to be sent to the processor 102. In this embodiment, the management CPU 210 is configured to make sure that the processor 102 is not performing the additional processing of the response coming from the incorrect drive. For example the correct drive, PCIe device 270, sends the data 271 or the data on the logical block addresses as indicated in the NVMe command 264. In this example, the PCIe device 270 may send the completion status and interrupt to the processor 102 through the FPGA 140. However for the incorrect drive, PCIe device 272, the management CPU 210 will intercept and disregard the completion status or interrupt coming from that drive. Accordingly, the FPGA facilitates reduction in latency by preventing unnecessary processing in the processor of the IHS 100.

Figure 3:
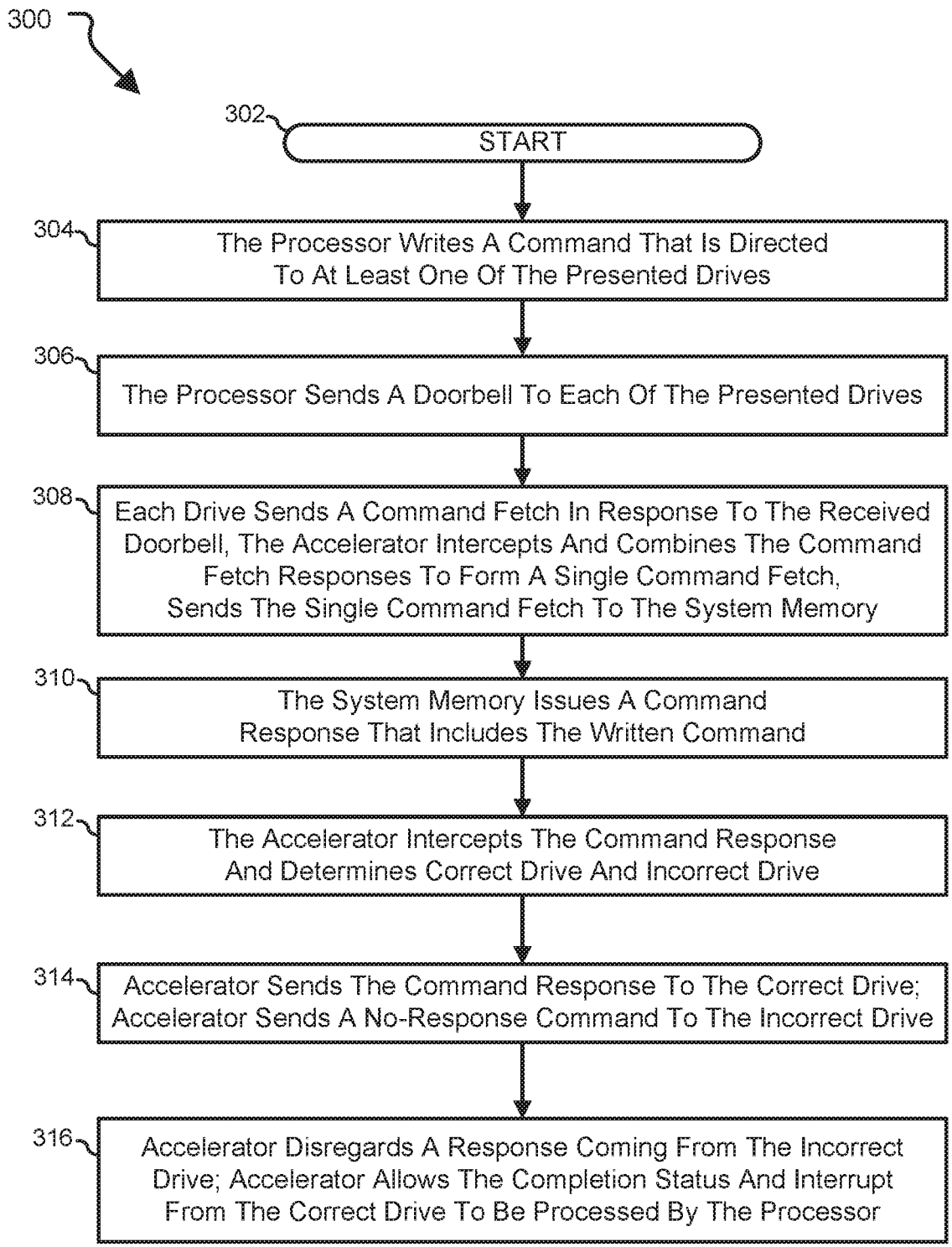
FIG. 3 is a flow chart showing a method of reducing latency in the information handling system by configuring the FPGA to disregard a response from an incorrect drive and saving the processor from doing additional processing, according to an embodiment of the present disclosure.

FIG. 3 shows a method 300 of reducing latency during the I/O transaction operation on the information handling device, starting at block 302. At block 304, the processor 102 writes the NVMe command that may be directed to at least one of the drives presented by the FPGA to the processor. For example, the NVMe command includes the NVMe command 264 that is stored in the NVMe queues 260 of the system memory 110. In this example, the presented drives may include the PCIe devices 270 and 272.

At block 306, the processor 102 sends a doorbell that signals presence of the new command in the NVMe queues. For example, the new command includes the NVMe command 264. In this example, the doorbell is intercepted and duplicated by the PCIe transaction replicator 220 based on the number of presented drives. Afterward, the PCIe transaction replicator will distribute the doorbell to each of the presented drives. For the presented PCIe devices 270 and 272, the doorbell is duplicated to generate a total of two doorbells. Each of the two doorbells will be received by the PCIe devices.

At block 308, each drive is configured to send a command fetch in response to the received doorbell. The PCIe transaction coalescer is configured to intercept the command fetch from each of the presented drives. For example, the presented drives include the PCIe devices 270 and 272. In this example, and in response to receiving of the doorbell, the PCIe devices 270 and 272 will send the first command fetch and the second command fetch, respectively. In this regard, PCIe transaction coalescer is configured to combine the first command fetch and the second command fetch to form a signal command fetch. The PCIe transaction coalescer sends the single command fetch to the system memory.

At block 310, and in response to receiving of the signal command fetch, the system memory issues a command response that includes the NVMe command 264. At block 312, the accelerator intercepts the command response and determines the correct drive and the incorrect drive. Based on this determination, the accelerator performs a mapping of the address of the command response in order to route the command response to the correct drive.

At block 314, the accelerator sends the command response to the correct drive. Furthermore, the accelerator sends the no-response command to the incorrect drive. At block 316, the accelerator disregards a response coming from the incorrect drive while the completion status or interrupt from the correct drive is forwarded to the processor for additional processing.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system having reduced latency of input/output transactions, comprising:
    a system memory;
    a processor coupled to the system memory, the processor to direct a command response issued by the system memory; and
    an accelerator coupled to the system memory, the accelerator configured to:
        intercept the command response from the processor and that is issued by the system memory;
        distinguish a correct drive from an incorrect drive based on an attribute of the command response;
        map an address of the command response and send the command response to the correct drive;
        send a no-response command to the incorrect drive; wherein the correct drive is configured to complete the command response, and the incorrect drive is configured to issue a completion and interrupt response including encoded information in reserved bits of the interrupt;
        receive the completion and interrupt response; and
        based on the encoded information in the reserved bits of the interrupt, discard the completion and interrupt response to prevent the processor from processing the completion and interrupt response from the incorrect drive.

2. The information handling system of claim 1 further comprising:
    a peripheral component interconnect express (PCIe) transaction replicator that is configured to intercept a single doorbell from the processor, duplicate the single doorbell, and send the doorbell to at least two drives that include the correct drive and the incorrect drive.

3. The information handling system of claim 2, wherein the PCIe transaction replicator duplicates the single doorbell based on a number of the drives that will receive the doorbell.

4. The information handling system of claim 2, wherein the processor is configured not to process the issued response from the incorrect drive in response to the accelerator discarding the issued completion and interrupt response.

5. The information handling system of claim 1, wherein the no-response command includes a No-Op command.

6. The information handling system of claim 1, wherein the no-response command includes a dummy command that is utilized by the accelerator as an indication for disregarding the issued completion and interrupt response from the incorrect drive.

7. The information handling system of claim 2, wherein the accelerator includes a peripheral component interconnect express transaction coalescer that is configured to:
   receive a command fetch from each of the at least two drives;
   combine each of the received command fetches to form a single command fetch; and
   send the single command fetch to the system memory.

8. The information handling system of claim 7, wherein the system memory issues the command response in response to the single command fetch.

9. The information handling system of claim 1, wherein the system memory is configured to store a non-volatile memory express (NVMe) command and issue the command response that includes the NVMe command.

10. A method, comprising:
    issuing, by a system memory, a command response;
    directing, by a processor, the command response issued by the system memory intercepting, by an accelerator, the command response from the processor;
    based on an attribute of the command response, distinguishing, by the accelerator, a correct drive from an incorrect drive;
    mapping, by the accelerator, an address of the command response and sending the command response to the correct drive;
    sending, by the accelerator, a no-response command to the incorrect drive;
    receiving, from the incorrect drive, a completion and interrupt response including encoded information in reserved bits of the interrupt; and
    based on the encoded information in the reserved bits of the interrupt,
       discarding, by the accelerator, the completion and interrupt response to prevent the processor from processing the completion and interrupt response from the incorrect drive.

11. The method of claim 10 further comprising:
    intercepting, by a peripheral component interconnect express (PCIe) transaction replicator within the accelerator, a single doorbell from the processor;
    duplicating, by the PCIe transaction replicator, the single doorbell; and
    sending, by the PCIe transaction replicator, the doorbell to each of the correct drive and the incorrect drive.

12. The method of claim 11, wherein the duplicating is based on a number of the correct drive and the incorrect drive that will receive the doorbell.

13. The method of claim 12, wherein the processor does not process the issued response from the incorrect drive in response to the accelerator discarding the issued completion and interrupt response.

14. The method of claim 10, wherein the no-response command includes a No-Op command.

15. The method of claim 10, wherein the no-response command includes a dummy command that is utilized by the accelerator as an indication for disregarding the issued completion and interrupt response from the incorrect drive.

16. The method of claim 10 further comprising:
    receiving, by a peripheral component interconnect express (PCIe) transaction coalescer, a command fetch from each of the correct drive and the incorrect drive;
    combining, by the PCIe transaction coalescer, each of the command fetches to form a single command fetch; and
    sending, by the PCIe transaction coalescer, the single command fetch to the system memory.

17. An information handling system, comprising:
    a system memory that is configured to issue a command response in response to a single command fetch;
    a processor coupled to the system memory, the processor to direct a command response issued by the system memory; and
    an accelerator coupled to the system memory, the accelerator configured to:
       intercept the command response from the processer;
       distinguish a correct drive from an incorrect drive based on an attribute of the command response;
       map an address of the command response and send the command response to the correct drive;
       send a no-response command to the incorrect drive;
       wherein the correct drive is configured to complete the command response, and the incorrect drive is configured to issue a response completion and interrupt response including encoded information in reserved bits of the interrupt;
       receive the completion and interrupt response; and
       based on the encoded information in the reserved bits of the interrupt, discard the completion and interrupt response to prevent the processor from processing the completion and interrupt response from the incorrect drive.

18. The information handling system of claim 17, further comprising:
    a peripheral component interconnect express (PCIe) transaction replicator within the accelerator, the PCIe transaction replicator is configured to intercept a single doorbell from the processor, duplicate the single doorbell to generate another doorbell, and send the doorbell to at least two drives that include the correct drive and the incorrect drive.

19. The information handling system of claim 18, wherein the PCIe transaction replicator duplicates the single doorbell based on a number of the drives that will receive the doorbell.

20. The information handling system of claim 18, wherein the accelerator includes a peripheral component interconnect express transaction coalescer that is configured to:
    receive a command fetch from each of the at least two drives;
    combine each of the received command fetches to form the single command fetch; and
    send the single command fetch to the system memory.

* * * * *